US006507737B1

(12) United States Patent
Laham et al.

(10) Patent No.: US 6,507,737 B1
(45) Date of Patent: Jan. 14, 2003

(54) METHOD FOR AUTOMATICALLY MONITORING CONTINUITY AND INTEGRITY OF COMMUNICATION TRUNKS

(75) Inventors: Mohammad Ali Laham, Basking Ridge, NJ (US); Philip Lamoureux, Succasunna, NJ (US); Eric David Leonard, Lake Hiawatha, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/163,940

(22) Filed: Sep. 30, 1998

(51) Int. Cl.[7] .................................................. H04Q 7/20
(52) U.S. Cl. ...................... 455/423; 455/424; 455/67.4; 455/115; 379/26.01; 379/26.02
(58) Field of Search ................................. 455/424, 426, 455/520, 67.1, 67.4, 9, 423; 379/5–6, 22, 23, 24, 25, 26, 26.01, 26.02, 32.02

(56) References Cited

U.S. PATENT DOCUMENTS

| 3,842,218 A | * | 10/1974 | DeLuca et al. ................ 379/28 |
| 4,056,698 A | * | 11/1977 | Dworak et al. ................ 379/24 |
| 4,197,427 A | | 4/1980 | Hutcheson et al. |
| 4,320,497 A | * | 3/1982 | Mori et al. .................. 370/248 |
| 4,455,455 A | * | 6/1984 | Little .......................... 379/203 |
| 4,747,130 A | * | 5/1988 | Ho .............................. 379/375 |
| 4,794,632 A | * | 12/1988 | Burton et al. ................. 379/22 |
| 4,841,560 A | * | 6/1989 | Chan et al. .................... 379/29 |
| 4,905,302 A | * | 2/1990 | Childress et al. ........... 455/515 |
| 5,353,326 A | * | 10/1994 | Jung ............................. 379/6 |
| 5,425,076 A | * | 6/1995 | Knippelmier ............... 455/424 |
| 5,621,782 A | * | 4/1997 | Walance et al. .............. 379/22 |
| 5,666,364 A | * | 9/1997 | Pierce et al. ................. 370/455 |
| 5,697,064 A | * | 12/1997 | Okamoto et al. ........... 455/507 |
| 5,761,273 A | * | 6/1998 | Sanders ...................... 379/399 |
| 5,818,904 A | * | 10/1998 | Dean ........................... 379/22 |
| 5,832,058 A | * | 11/1998 | Walance et al. .............. 379/22 |
| 5,881,129 A | * | 3/1999 | Chen et al. .............. 379/26.01 |
| 5,940,473 A | * | 8/1999 | Lee .............................. 379/22 |
| 6,011,960 A | * | 1/2000 | Yamada et al. ............... 455/77 |

* cited by examiner

Primary Examiner—Nay Maung
Assistant Examiner—Sonny Trinh
(74) Attorney, Agent, or Firm—Steve Mendelsohn; Yuri Gruzdkov

(57) ABSTRACT

Method for automatically determining whether a communication trunk is operating properly without having to take the trunk out of service and without the need of a craftsperson to initiate the testing of the communication trunk. The communication trunk is tested for continuity and integrity on a periodic or aperiodic basis.

16 Claims, 2 Drawing Sheets

METHOD FOR AUTOMATICALLY MONITORING CONTINUITY AND INTEGRITY OF COMMUNICATION TRUNKS

BACKGROUND OF THE INVENTION

1. Field of the Invention

The present invention provides for monitoring the continuity and integrity of communication trunks and more particularly for automatically monitoring communication trunks of a communication system.

2. Description of the Related Art

Communication systems comprise various communication equipment connected to each other by media (e.g., copper wire, coaxial cables, optical fibers) through which communication signals carrying information are conveyed. Communication equipment are various equipment that transmit and receive communication signals conveyed throughout a communication system. Communication systems are designed with media that have relatively large information capacities for conveying information within a communication system or between different communication systems. Such media are an important part of the infrastructure of communication systems and will hereinafter be referred to as communication links. Communication links are used, for example, to connect telephony systems to wireless communication systems. Communication links are logically configured as a bundle of communication channels commonly referred to as communication trunks.

Referring to FIG. 1, there is shown a wireless communication system (100) that uses communication links for interconnecting its communication equipment and to also connect to another communication system. The other communication system is a well known telephony system known as the Public Switched Telephone Network 142 (PSTN) familiar to users of telephony equipment (e.g., telephones, facsimile machines). Wireless communication system 100 comprises Base Stations (BS) representing equipment that are part of or form cells. The cells are symbolic representations of distinct geographical areas that define the physical boundaries within which a base station conveys (i.e., transmits and receives) user information. In particular BS 128 forms cell 134, BS 130 is part of cell 136, BS 132 is part of cell 140, BS 133 is part of cell 138. The Base Stations are communication equipment including radios that convey communication signals (i.e., transmit and receive) between users within the cells and also convey information over communication trunks connected to Switch 118 and Processor 124. User information, commonly referred to as subscriber traffic, is information generated by users. The Base Stations also convey system information which is information generated by communication equipment to control and operate the communication system. An example of system information is signaling information used by communication equipment to regulate the flow of user information within a communication trunk. In portions of the current PSTN and in wireless communication systems such as communication system 100, the subscriber voice traffic is represented in digital form known as Pulse Coded Modulation (PCM).

Switch 118 and Processor 124 are part of the communication equipment that convey system information for operating and controlling wireless communication 100. Switch 118 and Processor 124 are typically co-located with other equipment at a location referred to as a Mobile Switching Center (MSC). Thus, both Switch 118 and Processor 124 are located at MSC 144. BS 130 is connected to Switch 118 via communication link 106. Communication trunk link connects BS 132 to Switch 118. Communication link 110 connects BS 133 to Switch 118. Each Base Station is connected to Processor 124 via a system communication link. For purposes of clarity, each system communication link is denoted by a broken line. The system communication links (104, 112, 108, 116) can be part of a communication link or they can be physically separate links. The system communication links are connected between the Base Station equipment and Processor 124. Processor 124 is also connected to Switch 118 via a system communication link (122). Only system information are conveyed through the system communication links. Under the control of Processor 124, Switch 118 routes user information between PSTN 142 and wireless communication system 100 with the use of communication trunks within communication link 120. Switch 118 also routes user system information through the various communication trunks of the communication links connected to the Base Stations of wireless communication system 100. In particular, communication links 102, 106, 110, 112 and 114 all comprise communication trunks which are used by communication equipment within communication system 100 to convey user information. One particular well known Switch is the 5ESS Digital Cellular Switch (DCS) designed and manufactured by Lucent Technologies of Murray Hill, N.J. The system information is generated by Processor 124 allowing Processor 124 to control Switch 118 and control the operation of the communication trunks. System information is conveyed between Processor 124 and Switch 118 over system communication link 122. Processor 124 sends commands to Switch 118 over communication trunks within communication link 122 instructing Switch 118 to perform various system operations for the control the operation of the communication trunks.

BS station 128 is connected to Switch 118 via communication link 102. The physical length of some communication links is such that sometimes the communication signals suffer some degradation. In such cases, the communication links are provided with relay communication equipment (e.g., Relay 126) that revitalize the communication signals propagating through such communication links. Signal degradation also occur because of physical deformities (e.g., damaged cable) present at one or more points along the communication link.

The successful operation of wireless communication systems and other types of communication systems is largely dependent on the communication trunks used in such systems. System operators, i.e., owners of communication equipment and communication trunks, have used standard techniques for monitoring communication trunks and for determining whether such trunks are operating properly. For ease of understanding and for the purpose of illustration, a typical technique for monitoring a trunk is discussed using a communication trunk within communication link 102.

A craftsperson, typically employed by the system operator, first determines whether a trunk within link 102 is idle. An idle trunk is a communication trunk through which no user information is being conveyed. The craftsperson determines whether a particular trunk is idle by obtaining such information from Switch 118 or Processor 124. Such information is processed and stored in accordance with the protocol being followed by communication system 100. A protocol is a set of rules that define how communications between users and between communication equipment are initiated, maintained and terminated. It should be noted that a craftsperson can request that a trunk be made idle in which case Switch 118 under the control of Processor 124 removes subscriber traffic from the trunk to make the trunk idle.

Once a craftsperson has determined that trunk 102 is idle, the craftsperson sends a command (or commands) to Processor 124 requesting that the trunk within link 102 be taken out of service and then tested. Service to the users of the trunk is thus interrupted. The craftsperson sends the command by operating Processor 124 causing said equipment to transmit information recognized by Switch 118 as a request to take the trunk out of service and then to perform a continuity test for the trunk. Processor 124 also sends a request to BS 128 indicating that a particular trunk within link 102 is to be taken out of service and then tested. BS 128 typically comprises a test card (not shown) that is activated upon receipt of such a command and along with Switch 118 and Processor 124 performs the continuity test. BS 128 (and the other Base Stations) also comprises a radio (not shown) that transmits and receives communication signals over its corresponding communication link. Processor 124 seizes the trunk (within link 102) by taking complete control of the operation of the trunk. Processor 124 then takes the trunk "out of service" (OOS) meaning that no user information is henceforth allowed to be conveyed over the seized trunk until the trunk has been tested and released or put back into service. Processor 124 sends commands over system communication link 122 to instruct Switch 118 to operate the OOS trunk within communication link 102 in a test mode. Processor 124 also instructs (via system link 104) the test card in BS 128 to operate in a test mode. Test mode operation involves the transmission of certain audio tones through the OOS communication trunk being tested from Switch 118 to the test card of the corresponding Base Station (i.e., BS 128). In response, the test card in the corresponding Base Station transmits the same tones or different tones back to Switch 118. Switch 118 is programmed or set to detect the same tones or different tones. The communication trunk (within link 102) is operating properly if Switch 118 receives the proper tones transmitted by the test card at BS 128 within a defined period of time. Otherwise, the communication trunk is deemed to be non-operational. Thus, the test determines whether communication signals transmitted over the communication trunk are received by BS 128, i.e., the continuity of communication trunk is tested.

Performing a continuity test on a communication trunk in the manner described above has several drawbacks. First, the continuity test determines the current status of a trunk; it does not monitor the trunk continuously to determine if the status has changed. It is certainly possible, and reasonably likely, that a trunk that has been tested and deemed to be operating properly can become non-operational at any time after the continuity test has been completed.

Second, the continuity test requires that the trunk be taken out of service. An out of service trunk is unavailable to users for the period of time during which the continuity test is being conducted and thus the efficient use of such a trunk is adversely affected. Third, the continuity test has to be initiated by a craftsperson. The use of a craftsperson to initiate such a test is an added maintenance cost to a system operator.

Fourth, the continuity test simply determines whether there are any breaks in the communication link that would prevent a signal (i.e., a tone or tones) from being received by a base station located at one end of the communication link. Many communication links, such as link 102, have one or more intermediate equipment (e.g., relay equipment 126) connected thereto that, if improperly administered, can reflect the transmitted tone or tones back to Switch 118. If Switch 118 is set to receive the same tones that it transmitted, communication trunk link may be falsely deemed to be operational when in fact section 102a of communication link 102 has not been tested and may have a break in continuity.

The continuity test does not test the integrity of the communication links or the trunks within said links. The integrity of a communication link (or trunks within said link) is its ability to provide information that is intelligible at either of its ends. Thus, for a link of acceptable integrity, the equipment at either end of the communication link are able to receive intelligible information. The communication link may be in relatively poor physical condition or may have relatively poor electrical and/or optical characteristics that adversely affect the quality of the communication signals that propagate through it. Some well known manifestations of poor characteristics are signal amplitude degradation, phase jitter and frequency translation. In spite of these poor characteristics, a communication link may still be deemed operational from the results of a continuity test.

What is therefore needed is a method for monitoring automatically a communication trunk within a communication link to determine its integrity without having to take the trunk out of service and without the need of a craftsperson to initiate the testing of such a trunk.

SUMMARY OF THE INVENTION

The present invention provides a method for automatically monitoring communication trunks of a communication system on a periodic or aperiodic basis without using a craftsperson and without interrupting service to users of the communication trunk. First, the method of the present invention selects a trunk for testing. If it is determined that the selected trunk is idle, the trunk is tested. Otherwise the method of the present invention selects another trunk in accordance with a trunk selection algorithm. The selected trunk is tested for continuity and integrity by transmitting a particular test message over the trunk and receiving within a defined period of time a responding test message. The test will be interrupted at any time a need for its service to users arises. When a trunk has failed the test, it is taken out of service and the service provider is advised of the failure. After a trunk has passed the test or failed the test or a test has been interrupted, the method of the present invention selects the next trunk to be tested in accordance with trunk selection algorithm.

DETAILED DESCRIPTION

The present invention provides a method for automatically monitoring the trunks of a communication system without interrupting service to users of the trunk. The trunks are monitored without the use of a craftsperson to initiate the testing of such trunks. The monitoring of such trunks first involves determining whether a trunk is idle. Once it is determined that a trunk is idle the trunk is selected for testing. Test messages are conveyed over the trunk to test its continuity and integrity. After the completion of the test, the method of the present invention determines whether the trunk passed or failed the test. Another idle trunk is then selected in accordance with a trunk selection algorithm. If the trunk failed the test, Switch 118 sends a message to Processor 124 (via path 122) which sends the message to display equipment (e.g., printer, display screen; not shown) alerting the system operator (or craftsperson employed by system operator) of the failure and the trunk is taken out of service. The testing of a trunk can be interrupted at any time by any user who wishes to use such a trunk to convey information. When testing of a trunk is interrupted, the method of the present invention simply selects another idle trunk and proceeds to test that trunk. The monitoring of the trunks of a communication system is done on a periodic basis or on an aperiodic basis. Periodic monitoring refers to the monitoring of the trunks of a communication system at constant time interval. Aperiodic monitoring refers to the monitoring of the trunks of a communication system at varying time intervals. Automatic monitoring of a trunk is defined as not needing a craftsperson to initiate or perform the testing of the trunk. As discussed below, either Switch 118 or Processor 124 can initiate and perform the monitoring automatically.

Figure 1:
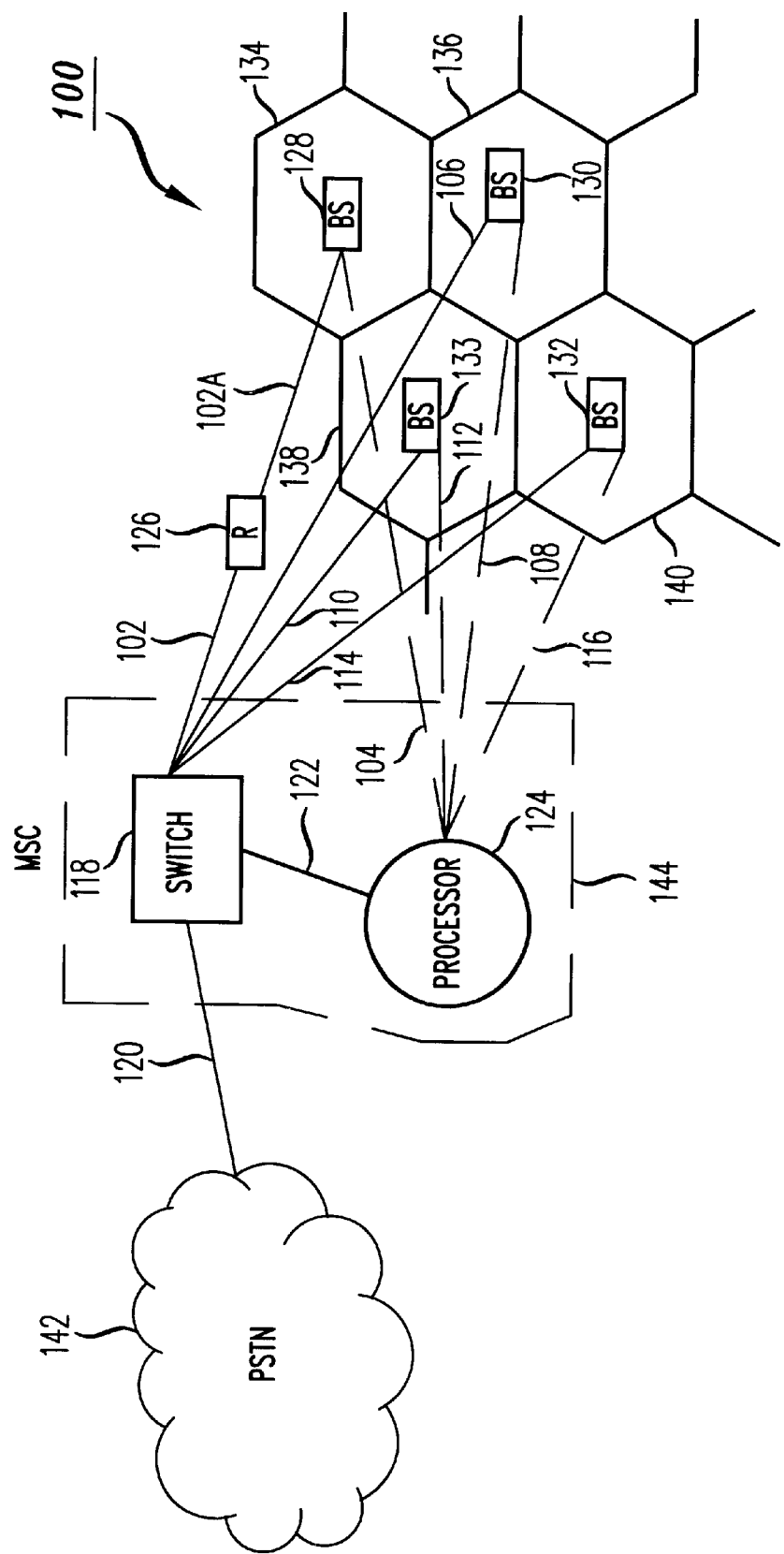
FIG. 1 is a system level diagram of a wireless communication system and the PSTN.
Figure 2:
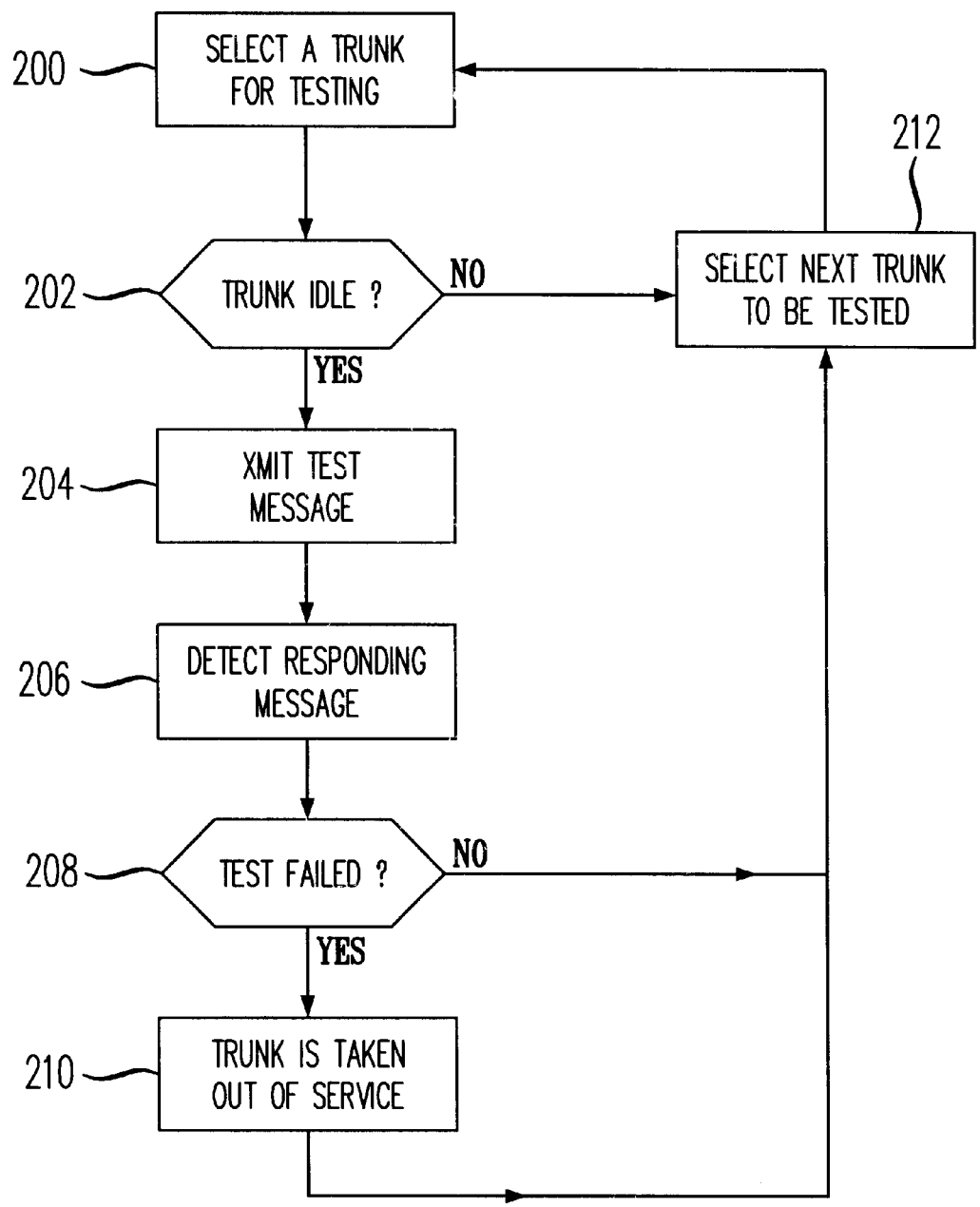
FIG. 2 is a block diagram of the method of the present invention.

Referring now to FIG. 2, there is shown the steps of the method of the present invention for a communication system such as the one shown in FIG. 1. It should be noted that the method of the present invention is not limited to a wireless communication systems or to any particular type of communication system. It should also be noted that the communication trunks can represent one particular communication channel or can represent a plurality of communication channels. For example each communication trunk of wireless communication system 100 can be organized as a Digital Signal Zero (DS0) communication channel. A DS0 channel is a digital communication channel having an information rate of 64 Kbps. A DS0 communication trunk is typically part of a DS1 communication link. A DS1 communication link comprises 24 DS0 trunks and has an information rate of 1.544 Mbps. The method of the present invention can be implemented as software residing in Switch 118 or Processor 124 or both. Also, the method of the present invention can be implemented as hardware controllable by Switch 118 and Processor 124. Corresponding hardware and/or software can be installed on the test cards of the Base Station equipment. For simplicity and ease of understanding, the particular steps of the method of the present invention will be explained with reference to a communication trunk within communication link 102 connected to Base Station equipment 128.

In step 200, the trunk to be tested is selected. The selection of the trunk to be tested is performed either by Processor 124 or Switch 118. Processor 124 uses a selection algorithm to select the trunk to be tested. The selection algorithm can be devised by the system operator or by the manufacturer of Processor 124. Switch 118 is connected directly to all the trunks of all the user communication links and thus simply selects a trunk it determines from on a list or a defined trunk order.

In Step 202, it is determined whether the selected trunk within communication link 102 is busy, i.e., whether user information is being conveyed over such trunk, or whether the trunk is idle. Switch 118 makes this determination by analyzing data sent over a trunk by communication equipment of wireless communication system 100. One technique of indicating that a communication trunk is idle is for Base Station 128 equipment to send a defined pattern, i.e., an idle message, (e.g., 010101010 . . . ) to Switch 118. Switch 118 recognizes the pattern as an "idle" message. The idle message also includes information that identify the trunk, the associated Base Station and its radio. One technique used for identifying the equipment is to have an identification number for each piece of equipment i.e., the trunk, the Base Station test card and radio. The identifying information is used to report test failures. Processor 124 determines whether the selected trunk is busy from information it receives over the system communication link from radio equipment and test card equipment located at the Base stations. If the trunk is busy the method of the present invention moves to step 212 and selects another trunk in accordance with a trunk selection algorithm (see discussion below). If trunk 102 is idle, the method of the present invention moves to step 204.

In step 204, a test message is sent over the selected trunk. In particular, Switch 118 transmits a test message over the selected trunk. Prior to sending the test message, Switch 118 sends a test mode message to Base Station 128 equipment (e.g., radio and test card) over the selected trunk in communication link 102 informing Base Station 128 equipment that the trunk is about to be tested. Base Station equipment (i.e., radio and test card) will thus enter into its test mode and await the test message from Switch 118. The test message is a defined block of information that Base Station 128 (i.e., the test card and the radio) is programmed or configured to detect. One example of a test message is a numerical counting sequence or a digital counting sequence that Base Station 128 is programmed or configured to detect. The test message can be any defined special text message devised by the system operator and/or the manufacturer of Switch 118. Once Base Station 128 (radio and test card) detects this message, it sends a responding message that Switch 118 is configured or programmed to detect. In this manner, not only is the continuity of the communication trunk is tested but also its integrity. Further, the test also indicates whether Base Station 128 is functioning properly. A properly functioning Base Station is able to detect information, process the detected information and transmit responding information over a communication trunk. It should be noted that at any time during the test, even while the test message is being transmitted, the method of the present invention can be interrupted by any user who wishes to used the communication trunk being tested. If the method of the present invention is interrupted, it simply selects another idle trunk in accordance with a trunk selection algorithm.

In step 206, the responding information transmitted by Base Station 128 is detected and analyzed by Switch 118 to confirm the continuity and integrity of the communication trunk and also confirm the proper functioning of Base Station 128. Switch 118 is configured and/or programmed to detect a certain responding message within a defined time period after transmitting the test message. If Switch 118 does not detect the expected responding message within the defined time period, it sends the test message a second time. In step 208, Switch 118 decides whether the communication trunk has failed the test. If Switch 118 did not detect the expected message for both transmissions of the test message, then the method of the present invention moves to step 210. If the expected message was received, then the method of the present invention moves to step 212. It should be noted that the technique for determining whether trunk 102 has passed is not limited to the one discussed above. For example, the test message can be transmitted three times before Switch 118 makes a decision. Also the responding message may be received but with some errors. In such a case, Switch 118 can decide to pass a trunk only if the responding message is received without any errors or if the responding message is received with a certain amount of errors that is below a defined error threshold. The error threshold is defined by the system provider and/or the manufacturer of Switch 118 or Processor 124.

In step 210, Switch 118 has decided that the trunk has failed the test. The trunk is taken out of service and Switch 118 sends a message Processor 124 which sends a message to display equipment (not shown) alerting the system provider that the trunk is not operating properly. The display equipment can be co-located with Switch 118 and Processor 124. The system provider will then take the necessary steps to investigate the trunk and to repair it as soon as possible.

In step 212 the method of the present invention determines the next trunk to be selected for testing. If Switch 118 is used to select the next trunk to be tested, the Switch analyzes the data being conveyed by using a defined order of trunks and determines whether the data is an idle pattern. Switch 118 selects the first idle trunk it discovers. Yet another technique is to cause Switch 118 to randomly select a trunk. The first trunk that is determined to be idle is selected as the next trunk to be tested. On the other hand, if Processor 124 is used to select the next trunk, several techniques can be used. One technique for selecting the next trunk is to use a "round-robin" procedure. The trunks of the communication system are listed in a certain order stored in Switch 118. The list is accessible to Processor 124. Processor 124 selects the trunks in accordance with the order of the list. Another procedure is to use a "Most Idle Trunk First" algorithm. In such an algorithm, Processor 124 maintains a record of the length of time a trunk has been idle and not yet tested within a defined period of time. The list of all currently idle trunks is analyzed and the trunk that has been idle for the longest period of time is selected as the next trunk to be tested. Conversely, the method of the present invention can select the trunk which has been idle for the shortest length of time. It will be readily understood that other well known techniques can be used in selecting the next trunk to be tested.

Regardless of whether a trunk is being tested, Switch 118 and/or Processor 124 receive signaling information that indicate when a user or users want to use the trunk. If at any time during any one of the steps discussed above, the idle trunk being tested is interrupted by a user, the method of the present invention will terminate the testing and select another idle trunk. Thus, the method of the present invention automatically monitors the trunks of a communication system on a periodic or aperiodic basis without the use of a craftsperson and without having to interrupt service to users of the trunk.

We claim:

1. At a mobile switching center (MSC) of a wireless communication system, a method for automatically monitoring integrity of one or more communication trunks in a communication link between the MSC and a base station of the wireless communication system, wherein a trunk integrity test comprises the steps of:
   (a) selecting a first idle communication trunk in the communication link by
      (1) selecting a communication trunk in the communication link; and
      (2) determining whether the selected communication trunk is idle by determining whether an idle message is received from the base station over the selected communication trunk;
   (b) transmitting a test message over the first idle communication trunk to the base station; and
   (c) characterizing the integrity of the first idle communication trunk based on whether an appropriate responding message is received from the base station over the first idle communication trunk within a defined period of time, wherein the trunk integrity test for the first idle communication trunk is interrupted before completion of the trunk integrity test if the MSC determines that user data is available for transmission over the first idle communication trunk.

2. The invention of claim 1, wherein step (b) further comprises the step of transmitting a test mode message over the first idle communication trunk to the base station prior to transmitting the test message.

3. The invention of claim 1, wherein step (c) comprises the step of determining whether the responding message is received with a certain amount of errors that is below a defined threshold.

4. The invention of claim 3, wherein step (c) comprises the step of determining whether the responding message is received without any errors.

5. The invention of claim 1, further comprising the step of taking the first idle communication trunk out of service after determining that the first idle communication trunk has failed the trunk integrity test.

6. The invention of claim 1, further comprising the step of automatically selecting, after either interrupting or completing the trunk integrity test for the first idle communication trunk, a second idle communication trunk in the communication link for application of the trunk integrity test.

7. The invention of claim 6, wherein the second idle communication trunk is selected based on a most idle trunk first algorithm.

8. The invention of claim 1, wherein:
   step (b) further comprises the step of transmitting a test mode message over the first idle communication trunk to the base station prior to transmitting the test message;
   step (c) comprises the step of determining whether the responding message is received with a certain amount of errors that is below a defined threshold; and further comprising the steps of:
      (d) taking the first idle communication trunk out of service after determining that the first idle communication trunk has failed the trunk integrity test; and
      (e) automatically selecting, after either interrupting or completing the trunk integrity test for the first idle communication trunk, a second idle communication trunk in the communication link for application of the trunk integrity test, wherein the second idle communication trunk is selected based on a most idle trunk first algorithm.

9. A mobile switching center (MSC) of a wireless communication system, wherein the MSC is configured to implement a method for automatically monitoring integrity of one or more communication trunks in a communication link between the MSC and a base station of the wireless communication system, wherein the MSC performs a trunk integrity test by:
   (a) selecting a first idle communication trunk in the communication link by:
      (1) selecting a communication trunk in the communication link; and
      (2) determining whether the selected communication trunk is idle by determining whether an idle message is received from the base station over the selected communication trunk;
   (b) transmitting a test message over the first idle communication trunk to the base station; and
   (c) characterizing the integrity of the first idle communication trunk based on whether an appropriate responding message is received from the base station over the first idle communication trunk within a defined period of time, wherein the trunk integrity test for the first idle communication trunk is interrupted before completion of the trunk integrity test if the MSC determines that user data is available for transmission over the first idle communication trunk.

10. The invention of claim 9, wherein, for step (b), the MSC transmits a test mode message over the first idle communication trunk to the base station prior to transmitting the test message.

11. The invention of claim 9, wherein, for step (c), the MSC determines whether the responding message is received with a certain amount of errors that is below a defined threshold.

12. The invention of claim 11, wherein, for step (c), the MSC determines whether the responding message is received without any errors.

13. The invention of claim 9, wherein the MSC takes the first idle communication trunk out of service after determining that the first idle communication trunk has failed the trunk integrity test.

14. The invention of claim 9, wherein the MSC automatically selects, after either interrupting or completing the trunk integrity test for the first idle communication trunk, a second idle communication trunk in the communication link for application of the trunk integrity test.

15. The invention of claim 14, wherein the second idle communication trunk is selected based on a most idle trunk first algorithm.

16. The invention of claim 9, wherein:

for step (b), the MSC transmits a test mode message over the first idle communication trunk to the base station prior to transmitting the test message;

for step (c), the MSC determines whether the responding message is received with a certain amount of errors that is below a defined threshold;

the MSC takes the first idle communication trunk out of service after determining that the first idle communication trunk has failed the trunk integrity test; and the MSC automatically selects, after either interrupting or completing the trunk integrity test for the first idle communication trunk, a second idle communication trunk in the communication link for application of the trunk integrity test, wherein the second idle communication trunk is selected based on a most idle trunk first algorithm.

* * * * *